Oct. 11, 1932.  R. W. LEWIS  1,881,735
TIRE COVER WITH WIRE MESH CENTER SHIELD
Filed June 17, 1931
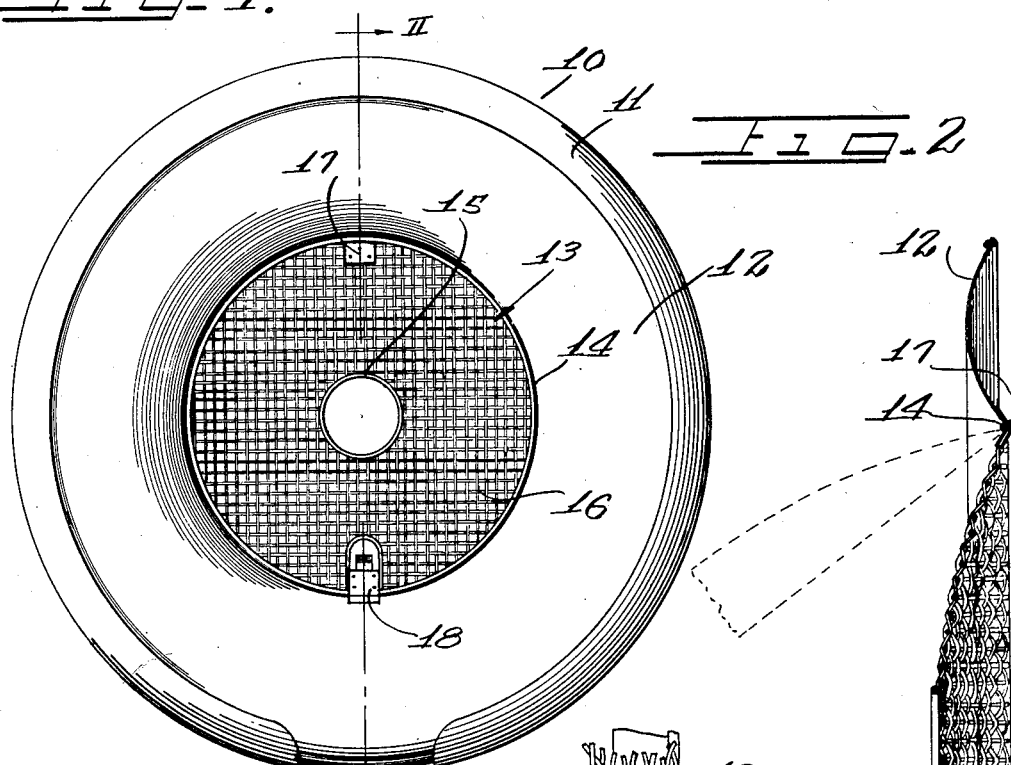
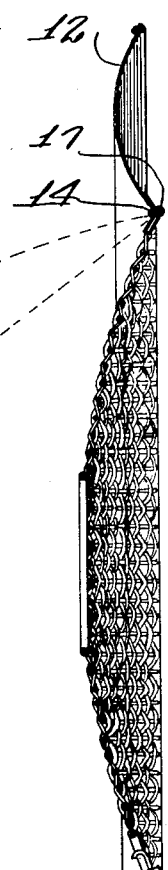
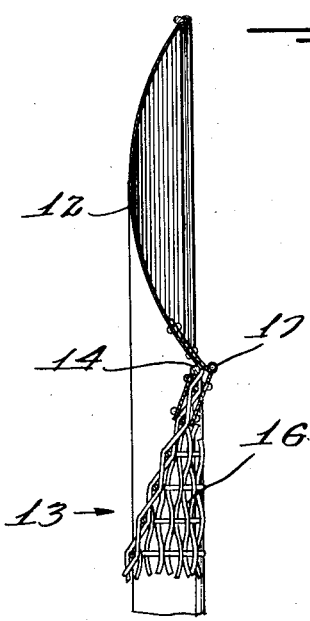
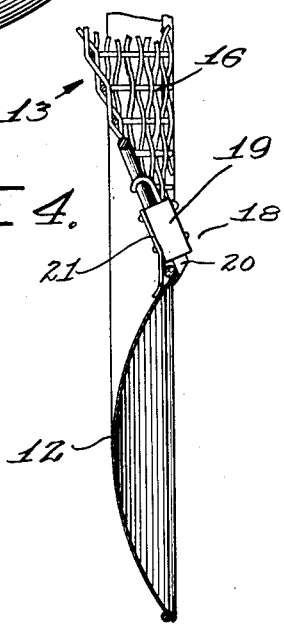
Inventor
Richard W. Lewis.
by Charles Hollen Attys.

Patented Oct. 11, 1932

1,881,735

UNITED STATES PATENT OFFICE

RICHARD W. LEWIS, OF DETROIT, MICHIGAN, ASSIGNOR TO LYON COVER COMPANY, OF DETROIT, MICHIGAN, A CORPORATION OF MICHIGAN

TIRE COVER WITH WIRE MESH CENTER SHIELD

Application filed June 17, 1931. Serial No. 544,988.

My invention relates to tire covers of the well known Lyon type and more particularly to a tire cover provided with a centrally disposed wire mesh shield.

An object of the invention is to provide an improved tire cover which not only covers the carcass of the tire but which will also provide a covering member at the center of the tire for disposition over the central portion or spokes of the wheel supporting the spare tire.

Another object of the invention is to provide a tire cover of the Lyon type with a centrally disposed wire mesh screen for aiding to prevent tampering with parts disposed at the center of the spare tire or wheel such as the projecting air valve part and the like.

In accordance with the general features of this invention there is provided a cover of the Lyon type which has disposed centrally of it a wire mesh screen hingedly connected at one side to the side plate of the cover and provided at its other side or end with latch means for cooperation with the side plate to hold the screen in proper position centrally of the tire or wheel.

Other objects and features of this invention will more fully appear from the following detailed description taken in connection with the accompanying drawing which illustrates a single embodiment thereof and in which Figure 1 is a side view of a tire cover embodying the features of this invention and applied to a tire;

Figure 2 is an enlarged sectional view taken on substantially the line II—II of Figure 1 looking in the direction indicated by the arrows and illustrating in dotted lines the position of the screen when it is swung to an open position;

Figure 3 is an enlarged fragmentary sectional view of the hinged end of the wire mesh screen; and Figure 4 is a view similar to Figure 3 only showing the latch end of the wire mesh screen.

The reference character 10 designates generally a cover of the Lyon type which includes a split annular rim 11 and a side plate 12 adapted to be held in position on the tire by the rim 11. In the mounting of this tire cover upon the tire the side plate 12 which is of a ring-like construction and has a cross section conforming with the contour of a side wall of the tire is disposed on a side of the tire and thereafter the rim 11 is shoved onto the outer periphery of the tire into tire cover retaining engagement with the tire. One flange of this rim as will be evident from Figure 1 engages or overlaps the outer peripheral edge of the side plate 12 and serves to hold this plate in position on the tire.

Now it is of course to be understood that although I have illustrated my invention as being applied to a cover of the Lyon type the invention is not to be limited to this specific application for it can quite obviously be used with tire covers of a different type and construction.

In accordance with my invention the part of the cover formed to cover the side wall of the tire has associated with its inner peripheral edge a centrally disposed wire mesh screen 13 which is of circular shape. This screen may be made of a diameter slightly less than that of the opening at the center of the side plate 12. Also it is to be noted that the wire mesh screen has a convex construction and is fabricated from two rings 14 and 15 connected by a ring-like piece of wire mesh 16.

This wire mesh screen is hinged at 17 to the inner peripheral edge of the plate 12 and has secured to it diametrically opposite the hinge 17 a latching device 18.

The latching device 18 as best shown in Figure 4 includes a housing 19 in which is disposed a downwardly urged spring bolt 20, the latching end of which is adapted to engage the inner peripheral edge of the plate 12 to hold the screen in position. The spring urged bolt 20 is so supported in the housing 19 that it is at all times urged in a direction tending to cause its latching end to engage with the inner peripheral edge of the cover plate 12 but is on the other hand adapted to be cammed or moved out of engagement with this edge of the plate when it is desired to swing the edge of the screen to an open position such as that indicated by dotted lines in Figure 2. A spring plate 21 secured to the front side of the latch housing 19 limits the inward travel of this end of the screen.

This screening device of my invention not only enhances the appearance of the tire cover but also aids in preventing children from tampering with the parts of the tire or wheel such as the air valve of the tire or the spokes of a wheel. Further if it is so desired the latching device 18 may be of the key operated type so as to require the use of a key in order to raise the latch out of engagement with the inner peripheral edge of the plate 12 when it is desired to raise the screen to the dotted line position shown in Figure 2.

Then too I desire it understood that while I have illustrated this device 13 in the form of a screen it could also be made of other material such for example as sheet metal. In the event that it is made of sheet metal it would comprise a disc-like closure for the central part of the spare tire cover and wheel.

Now I desire it understood that although I have illustrated and described in detail the preferred embodiment of the invention, the invention is not to be thus limited but only insofar as defined by the scope and spirit of the appended claims.

I claim as my invention:

1. In a tire cover including a ring-like side portion for covering a side of the tire, a central disk disposed over the ring-like opening at the center of the tire and connected to said side portion so as to be capable of being moved away from said opening, and means for latching said disk to the side plate to prevent accidental displacement of the disk.

2. In a tire cover including a ring-like side portion for covering a side of the tire, a central disk disposed over the ring-like opening at the center of the tire and connected to said side portion so as to be capable of being moved away from said opening, the connection between said side portion and disk comprising a hinge whereby the disk may be pivotally moved out of its closure position over said opening.

3. In a spare tire cover including a ring-like portion for covering a side of the tire, a central disc disposed over a ring-like opening at the center of the tire and movable away from said opening without requiring removal of said side covering portion from the tire.

In testimony whereof I have hereunto subscribed my name at Detroit, Wayne County, Michigan.

RICHARD W. LEWIS.